US012704326B2

(12) United States Patent
Pienimáki et al.

(10) Patent No.: US 12,704,326 B2
(45) Date of Patent: Aug. 11, 2026

(54) METALLURGICAL FURNACE

(71) Applicant: Metso Metals Oy, Espoo (FI)

(72) Inventors: Kari Pienimáki, Espoo (FI); Harri Talvensaari, Nummela (FI); Jouko Kangas, Nurmijärvi (FI); Kaarle Peltoniemi, Espoo (FI); Päivi Suikkanen, Pori (FI)

(73) Assignee: METSO METALS OY, Espoo (FI)

( * ) Notice: Subject to any disclaimer, the term of this patent is extended or adjusted under 35 U.S.C. 154(b) by 426 days.

(21) Appl. No.: 18/547,341

(22) PCT Filed: Feb. 24, 2021

(86) PCT No.: PCT/FI2021/050134
§ 371 (c)(1),
(2) Date: Aug. 22, 2023

(87) PCT Pub. No.: WO2022/180297
PCT Pub. Date: Sep. 1, 2022

(65) Prior Publication Data

US 2024/0133629 A1 Apr. 25, 2024

(51) Int. Cl.
*F27B 3/24* (2006.01)
*F27B 3/12* (2006.01)
(Continued)

(52) U.S. Cl.
CPC .................. *F27B 3/24* (2013.01); *F27B 3/12* (2013.01); *F27D 1/12* (2013.01); *F27B 2003/125* (2013.01); *F27D 2009/0018* (2013.01)

(58) Field of Classification Search
CPC ........ F27B 3/24; F27B 3/12; F27B 2003/125; F27B 1/12; F27D 1/12; F27D 2009/0018; F27D 1/14; F27D 9/00
(Continued)

(56) References Cited

U.S. PATENT DOCUMENTS 3,314,668 A * 4/1967 Rosenak .................. C21B 7/10 266/190
5,867,523 A 2/1999 Wasmund et al.
(Continued)

FOREIGN PATENT DOCUMENTS

CN 101424485 A 5/2009
EP 1302551 A1 4/2003
(Continued)

OTHER PUBLICATIONS

Examination Report for Australian Application No. 2021429382, Aug. 9, 2024, 2 pages.
(Continued)

*Primary Examiner* — Jessee R Roe
*Assistant Examiner* — Michael Aboagye
(74) *Attorney, Agent, or Firm* — Carter, DeLuca & Farrell, LLP

(57) ABSTRACT

A metallurgical furnace including a hearth, a sidewall structure, and a surrounding cooling element structure including cooling elements. Each cooling element have a planar back surface. A surrounding binding structure including binding sections surrounds partly the surrounding surface. Adjacent binding sections of the surrounding binding structure are connected by tension assemblies. At least one planar back surface of at least one cooling element is parallel with and is in a horizontal direction of the metallurgical furnace supported by at least one planar surface means of at least one binding section of the surrounding binding structure. Said at least one cooling element of the surrounding cooling element structure is located at least partly between the surrounding surface and said one binding section.

15 Claims, 8 Drawing Sheets

(51) Int. Cl.
*F27D 1/12* (2006.01)
*F27D 9/00* (2006.01)

(58) Field of Classification Search
USPC ........ 266/200, 280, 285, 286, 241, 193, 194
See application file for complete search history.

(56) References Cited

U.S. PATENT DOCUMENTS

| | | | | |
|---|---|---|---|---|
| 8,245,653 B2 * | 8/2012 | McCaffrey | F27B 3/12 | 110/336 |
| 8,480,947 B2 * | 7/2013 | Saarinen | F27D 1/12 | 266/46 |
| 8,696,978 B2 * | 4/2014 | MacRae | F27B 3/24 | 266/241 |
| 2008/0190336 A1 | 8/2008 | MacRae | | |
| 2013/0099430 A1 | 4/2013 | MacRae | | |
| 2017/0191658 A1 | 7/2017 | Van Der Hoeff et al. | | |

FOREIGN PATENT DOCUMENTS

| | | | |
|---|---|---|---|
| KR | 20190000437 U | 2/2019 | |
| WO | 2006092053 A1 | 9/2006 | |
| WO | 2016083668 A1 | 6/2016 | |
| WO | WO2016083668 * | 6/2016 | F27D 1/12 |
| WO | 2019147920 A1 | 8/2019 | |

OTHER PUBLICATIONS

Notice to Decision to Grant for JP 2023-551158 with English Translation, 4 pages.
Chile Office Action for Application No. 202302488 dated Aug. 19, 2024, 3 pages.
International Search Report issued by the Finnish Patent & Registration Office acting as the International Searching Authority in relation to International Application No. PCT/FI2021/050134 dated Aug. 9, 2021 (7 pages).
Written Opinion of the International Searching Authoirty issued by the Finnish Patent & Registration Office acting as the International Searching Authority in relation to International Application No. PCT/FI2021/050134 dated Aug. 9, 2021 (9 pages).
International Preliminary Report on Patentability issued by the European Patent Office acting as the International Preliminary Examining Authority in relation to International Application No. PCT/FI2021/050134 dated Jan. 30, 2023 (1 page).
African Examination Report for AP/P/2023/015163 dated Mar. 27, 2025, 5 pages.

* cited by examiner

METALLURGICAL FURNACE

CROSS-REFERENCE TO RELATED APPLICATIONS

This application is a national phase entry under 35 U.S.C. 371 of PCT International Application No. PCT/FI2021/050134 filed Feb. 24, 2021, the disclosure of this application is expressly incorporated herein by reference in its entirety.

FIELD OF THE INVENTION

The invention relates to a metallurgical furnace.

Publication WO 2016/083668 presents a metallurgical furnace having a durable structure and a long service-life.

OBJECTIVE OF THE INVENTION

The object of the invention is to provide a metallurgical furnace that has a more durable structure and a longer service-life.

LIST OF FIGURES

Figure 1:
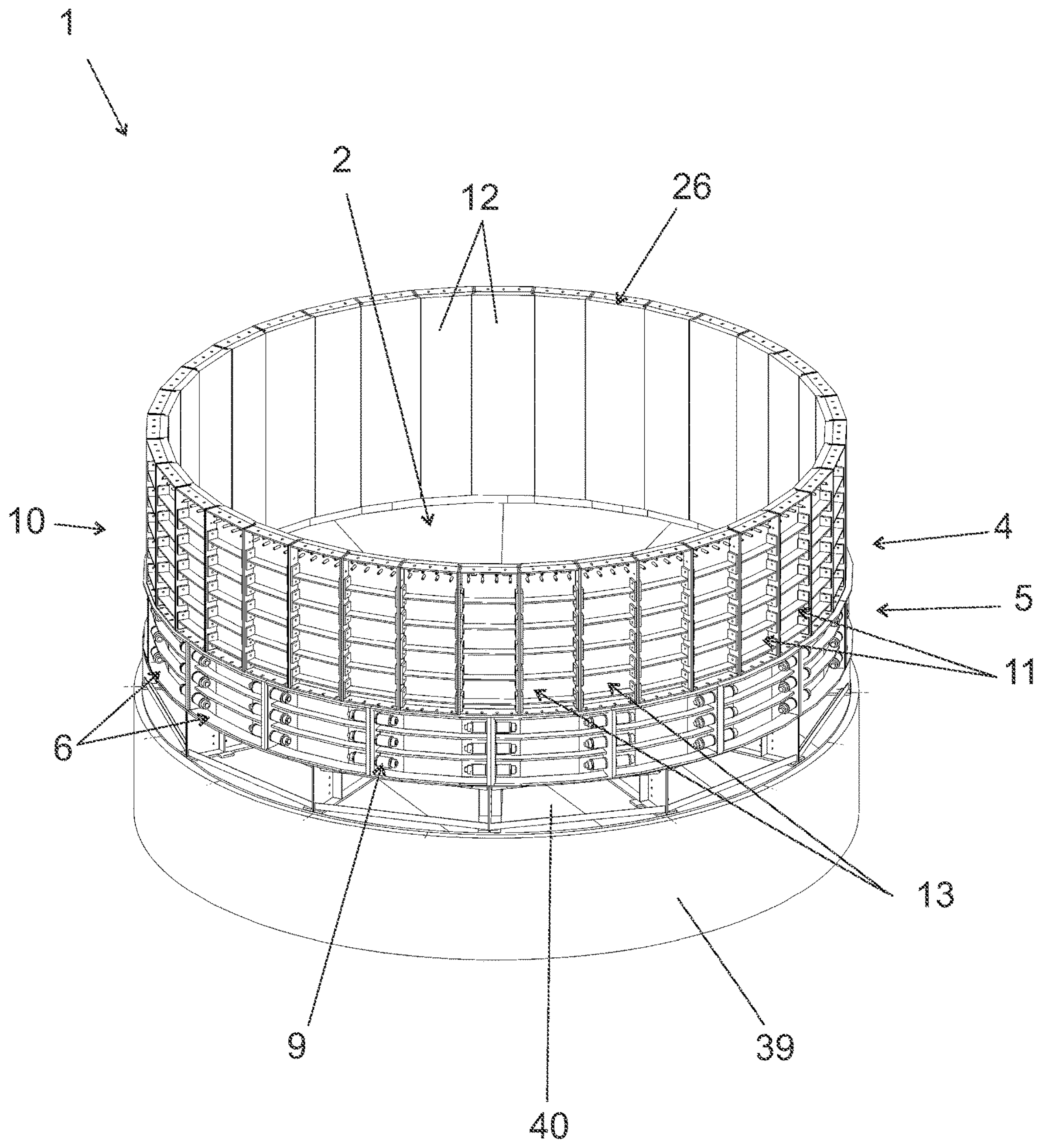
Figure 2:
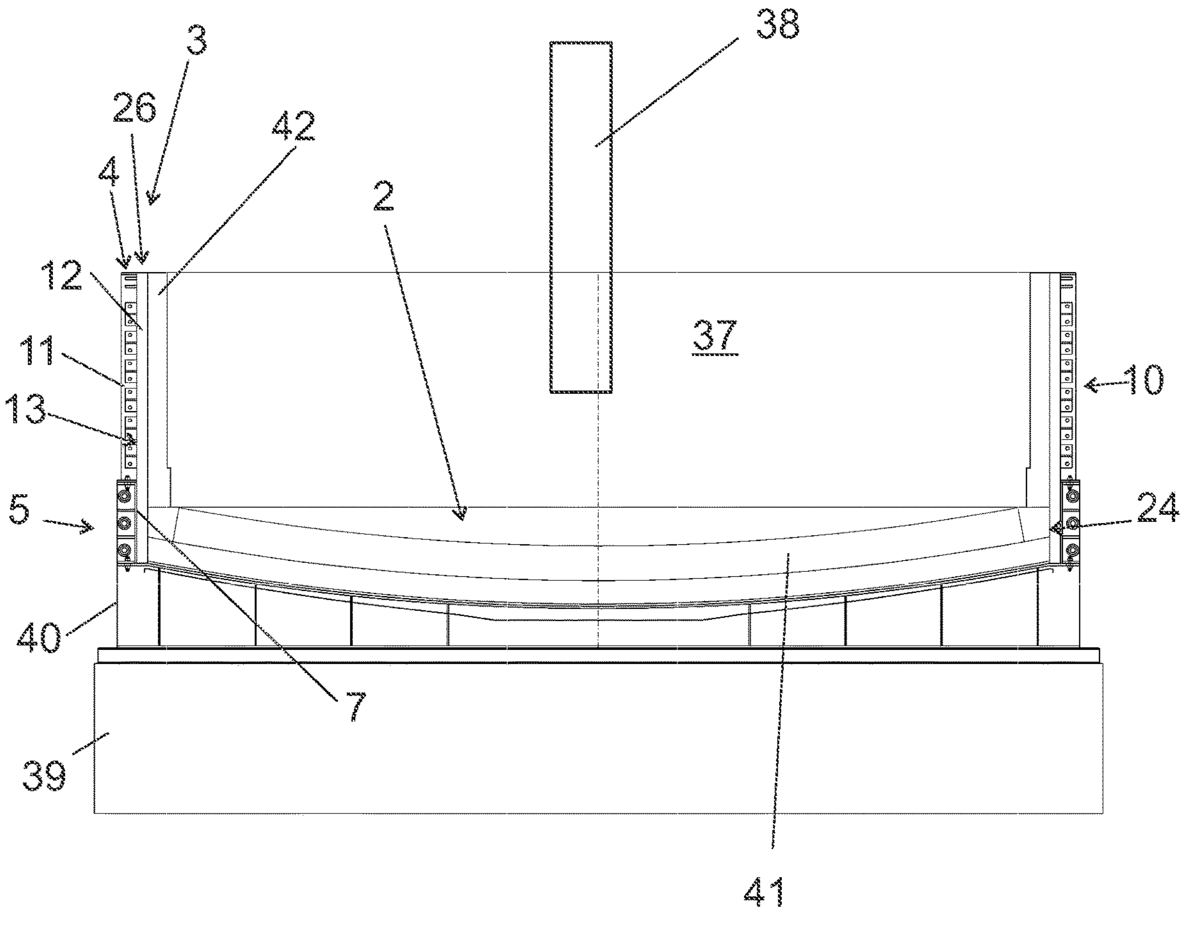
Figure 3:
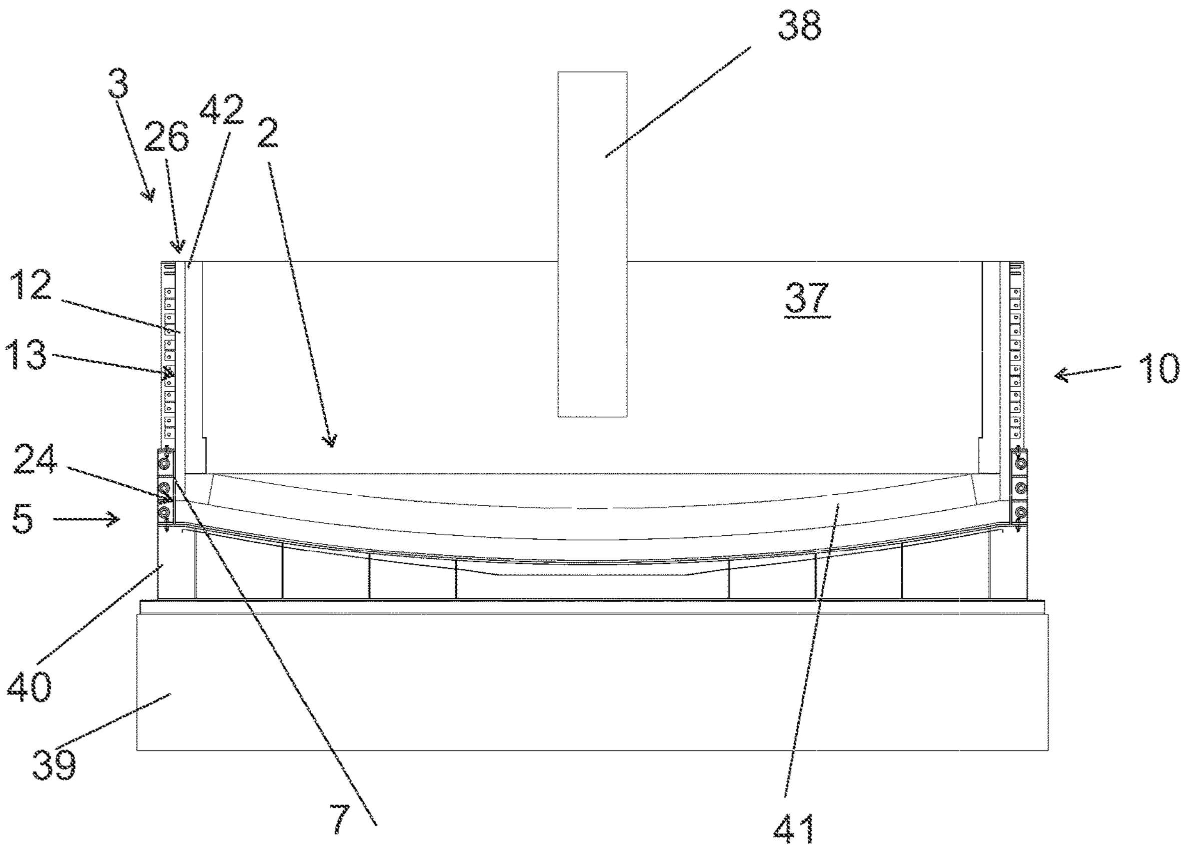
Figure 4:
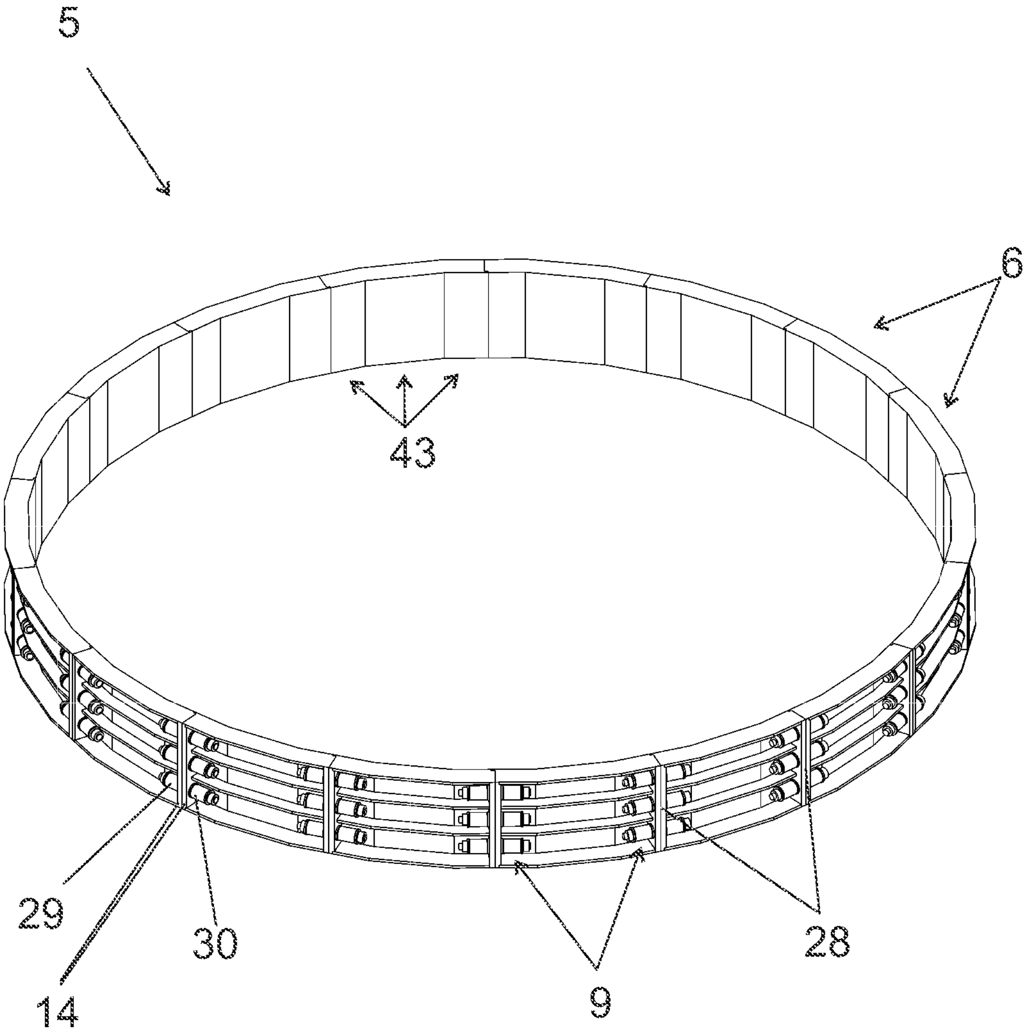
Figure 5:
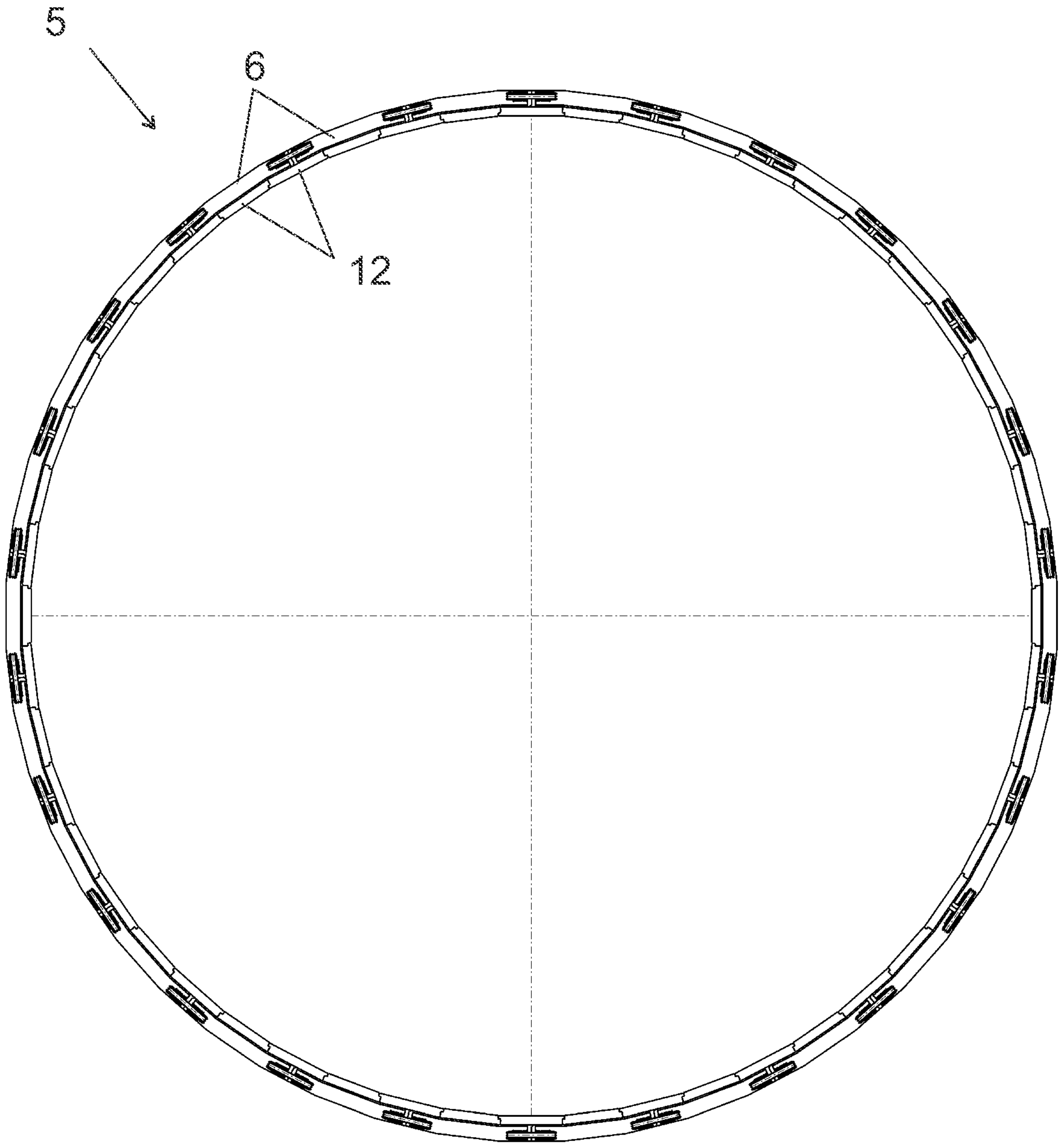
Figure 6:
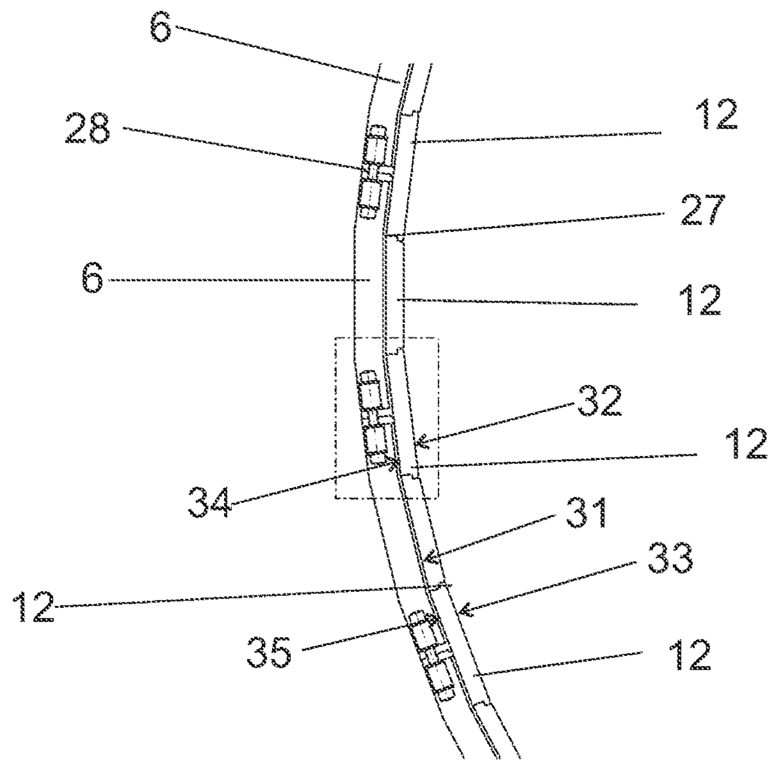
Figure 7:
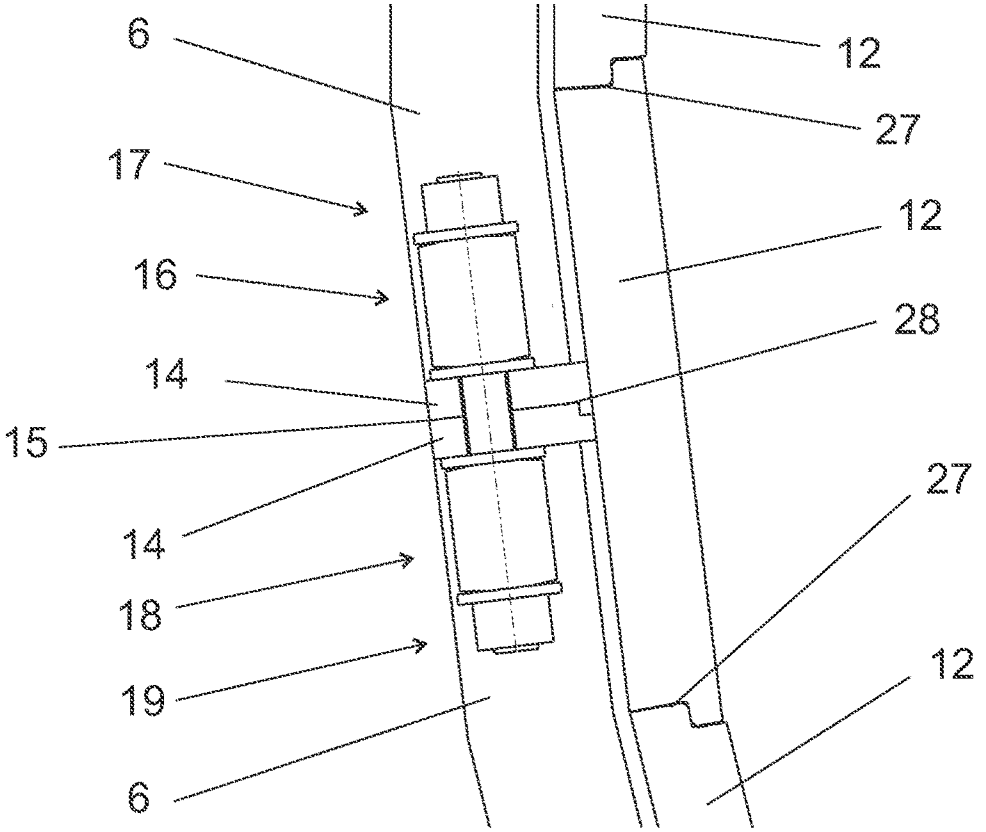
Figure 8:
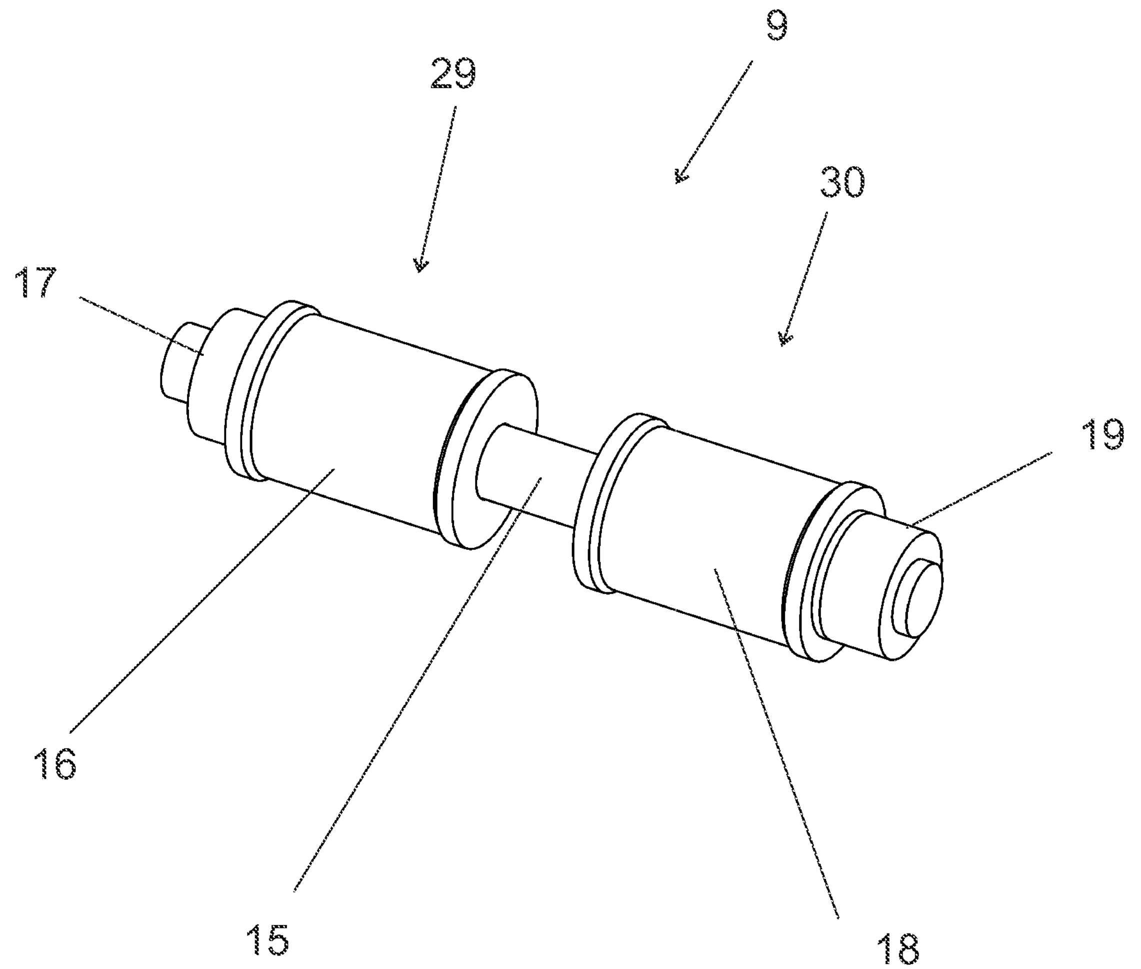
Figure 9:
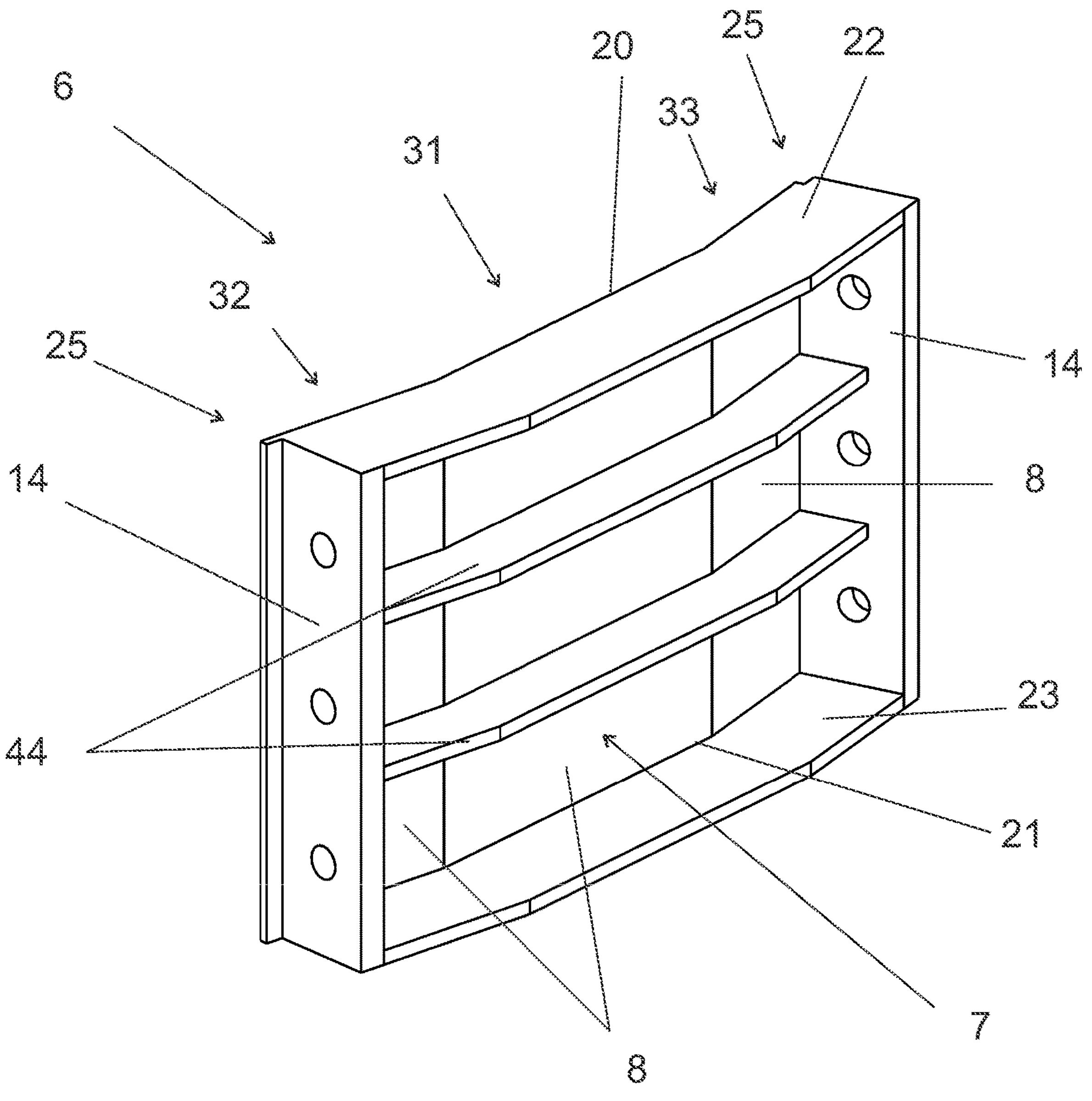

In the following the invention will described in more detail by referring to the figures, of which FIG. 1 shows a part of a metallurgical furnace, FIG. 2 shows the metallurgical furnace shown in FIG. 1 in cross-section, FIG. 3 shows in cross-section an alternative configuration for a metallurgical furnace, FIG. 4 shows the surrounding binding structure of the metallurgical furnace illustrated in part in FIG. 1, FIG. 5 shows the surrounding binding structure illustrated in FIG. 4 as seen from above or as seen from below, FIG. 6 shows a detail of the surrounding binding structure illustrated in FIG. 4, FIG. 7 shows a detail of the surrounding binding structure illustrated in FIG. 4, FIG. 8 shows a tension assembly of the surrounding binding structure illustrated in FIG. 4, and FIG. 9 shows a binding section of the surrounding binding structure illustrated in FIG. 4.

DETAILED DESCRIPTION OF THE INVENTION

Next the metallurgical furnace 1 and some embodiment and variants of the metallurgical furnace 1 will be presented in greater detail.

The metallurgical furnace 1 comprises a hearth 2 comprising a surrounding surface 24.

The metallurgical furnace 1 comprises a sidewall structure 3 that extends upwards from the hearth 2 of the metallurgical furnace 1.

The metallurgical furnace 1 comprises a surrounding cooling element structure 26 comprising cooling elements 12. Each cooling element 12 of the surrounding cooling element structure 26 has a planar back surface 13. Each cooling element 12 of the surrounding cooling element structure 26 can additionally have a planar fire surface (not marked with a reference numeral) that is parallel with the planar back surface. Cooling elements 12 having a planar back surface 13 and preferably also planar fire surface are easier to manufacture that cooling element with curved surfaces. Cooling elements 12 having a planar back surface 13 and preferably also planar fire surface have a good cooling ability and this leads to a more durable structure of the metallurgical furnace 1 and to a longer service-life of the metallurgical furnace 1.

The cooling elements 12 can for example be made of material containing copper. The number of the cooling elements 12 in the surrounding cooling element structure 26 can for example be 30 to 80.

The metallurgical furnace 1 comprises a surrounding binding structure 5 of metal surrounding at least partly the surrounding surface 24 of the hearth 2 of the metallurgical furnace 1.

The surrounding binding structure 5 comprising binding sections 6 of metal each binding section 6 comprising at least one planar surface means 43. Said at least one planar surface means 43 can be a continuous surface or be formed of several planar surface sections (not illustrated) together forming said at least one planar surface means 43. With such at least one planar surface means 43 can the cooling elements 12 be evenly pressed such that the cooling element 12 remains planar and does not bend effect and this leads to a more durable structure of the metallurgical furnace 1 and to a longer service-life of the metallurgical furnace 1. The number of the binding sections 6 in the surrounding binding structure 5 can for example be 15 to 40. Adjacent binding sections 6 of the surrounding binding structure 5 are connected by tension assemblies 9 configured to allow relative movement between adjacent binding sections 6 in the surrounding binding structure 5 and configured to force adjacent binding sections 6 in the surrounding binding structure 5 in a direction towards each other. The tension assemblies 9 allows that the binding sections 6 of the binding structure 5 can move independently with respect to each other. An advantage of this is that the surrounding binding structure 5 can automatically adapt to local thermal expansion peaks, in other words, automatically adapt to that the metallurgical furnace 1 locally thermally expands more at one binding section 6 or at more binding sections 6 of the surrounding binding structure 5 than at other binding sections 6 of the surrounding binding structure 5. This leads to a more durable structure and to a longer service-life.

The surrounding cooling element structure 26 is at least partly, preferably partly, surrounded by the surrounding binding structure 5. Because the surrounding cooling element structure 26 thus also cools in the vertical direction other parts in the metallurgical furnace 1 than the hearth 2 and because the surrounding cooling element structure 26 is compressed by surrounding cooling element structure 26 by the surrounding binding structure 5 against the surrounding surface 24 of the hearth 2, the result is a more durable structure of the metallurgical furnace 1 and a longer service-life of the metallurgical furnace 1

At least one planar back surface 13 of at least one cooling element 12 of the surrounding cooling element structure 26 is parallel with at least one planar surface means 43 of one binding section 6 of the surrounding binding structure 5 and is in a horizontal direction of the metallurgical furnace 1 supported by said at least one planar surface means 43 of one binding section 6 of the surrounding binding structure 5. Said at least one cooling element 12 of the surrounding cooling element structure 26 is located at least partly, preferably partly, between the surrounding surface 24 of the hearth 2 of the metallurgical furnace 1 and said at least one planar surface means 43 of said one binding section 6 of the surrounding binding structure 5.

At least 50%, preferably at least 75%, more preferably at least 90%, of the planar back surfaces 13 of the cooling elements 12 of the surrounding cooling element structure 26 are parallel with at least one planar surface means 43 of one binding section 6 of the surrounding binding structure 5 and are in a horizontal direction of the metallurgical furnace 1 supported by said at least one planar surface means 43 of one binding section 6 of the surrounding binding structure 5. This leads to a more durable structure and to a longer service-life.

Preferably, but not necessarily, the planar back surface 13 of all cooling elements 12 of the surrounding cooling element structure 26 are parallel with at least one planar surface means 43 of one binding section 6 of the surrounding binding structure 5 and are in a horizontal direction of the metallurgical furnace 1 supported by at least one planar surface means 43 of said at least one binding section 6 of the surrounding binding structure 5. This leads to a more durable structure and to a longer service-life.

At least 50%, preferably at least 75%, more preferably at least 90%, of the cooling elements 12 of the surrounding cooling element structure 26 are located at least partly between the surrounding surface 24 of the hearth 2 of the metallurgical furnace 1 and said one binding section 6 of the surrounding binding structure 5. This leads to a more durable structure and to a longer service-life.

Preferably, but not necessarily, all cooling elements 12 of the surrounding cooling element structure 26 are located partly between the surrounding surface 24 of the hearth 2 of the metallurgical furnace 1 and at least one planar surface means 43 of at least one binding section 6 of the surrounding binding structure 5. This leads to a more durable structure and to a longer service-life.

Because of the planar surface means 43 of the binding section 6 of the surrounding binding structure 5, cooling elements 12 having planar back surfaces 13 can be used in the surrounding cooling element structure 26 and because of the co-operation between planar surface means 43 of the binding sections 6 and the planar back surfaces 13 of the cooling elements 12 in the surrounding cooling element structure 26, the hearth 2 of the metallurgical furnace 1 will be evenly compressed together without creating local compression peaks both indirectly via the surrounding cooling element structure 26 and directly by means of the surrounding binding structure 5, if the surrounding cooling element structure 26 is located partly between the surrounding surface 24 of the hearth 2 of the metallurgical furnace 1 and said at least one binding section 6 of the surrounding binding structure 5 so that the surrounding cooling element structure 26 does not completely surround the surrounding surface 24 of the hearth 2, as in the metallurgical furnace 1 illustrated in FIG. 3. This leads to a more durable structure and to a longer service-life.

Because of the planar surface means 43 of the binding section 6 of the surrounding binding structure 5, cooling elements 12 having planar back surfaces 13 can be used in the surrounding cooling element structure 26, and because of the co-operation between planar surface means 43 of the binding sections 6 and the planar back surfaces 13 of the cooling elements 12 in the surrounding cooling element structure 26, the hearth 2 of the metallurgical furnace 1 will be evenly compressed together indirectly via the surrounding cooling element structure 26, if the surrounding cooling element structure 26 completely surrounds the surrounding surface 24 of the hearth 2 of the metallurgical furnace 1 between the surrounding surface 24 of the hearth 2 of the metallurgical furnace 1 and said at least one binding section 6 of the surrounding binding structure 5, as in the metallurgical furnace 1 illustrated in FIG. 2. This leads to a more durable structure and to a longer service-life.

Provision of binding sections 6 in the surrounding binding structure 5 having such planar surface means 43 and using of cooling elements 12 having planar back surfaces 13 in the surrounding cooling element structure 26 allows also to arrange said at least one cooling element 12 of the surrounding cooling element structure 26 partly between the surrounding surface 24 of the hearth 2 of the metallurgical furnace 1 and said at least one binding section 6 of the surrounding binding structure 5. The advantage of this is that the surrounding cooling element structure 26 is capable of providing effectively cooling also for the hearth 2 of the metallurgical furnace 1. The hearth 2 is a part of the metallurgical furnace that tends to thermally expand and effective binding and compressing and cooling of the hearth 2 prolongs for example the service of possible continuous layers 41 of refractory material of the hearth 2. The metallurgical furnace 1 can for example be a pyrometallurgical furnace or an electrical arc furnace.

The hearth 2 and the sidewall structure 3 limits preferably, but not necessarily, at least partly a furnace space 37 configured to hold molten material such as molten material containing molten metal. An energy means 38 such as an electrode or an oxygen containing gas feeding lance can be configured increase the level of thermal energy to the furnace space 37 so that the energy means 38 is provided at least partly in the furnace space 37 as illustrated in FIGS. 2 and 3. The energy means 38 can be provided essentially concentrically with the sidewall structure 3 as illustrated in FIGS. 2 and 3 so that thermal energy is fed to the center of the furnace space 37 of the metallurgical furnace and thermal energy flows from the center of the furnace space 37 of the metallurgical furnace towards the sidewall structure 3 and towards the hearth of the metallurgical furnace.

The metallurgical furnace 1 can have a discharge opening (not illustrated) for discharging molten material such as molten metal from the furnace space 37.

The metallurgical furnace 1 can have a discharge opening (not illustrated) for discharging slag from the furnace space 37.

The metallurgical furnace 1 can have a foundation 39 of concrete, as illustrated in the figures. A cooled supporting structure 40 can be provided between the hearth 2 of the metallurgical furnace and the foundation 39 of concrete as illustrated in the figures.

The hearth 2 can comprise at least one continuous layer 41 of refractory material, wherein said at least one continuous layer 41 of refractory material is laterally limited by the surrounding surface 24 of the hearth 2. Said at least one continuous layer 41 of refractory material can comprise refractory bricks or refractory material capable of withstand temperature of at least 500° C., preferably of at least 1000° C.

The sidewall structure 3 can comprise at least one continuous surrounding upright refractory layer 42 that is directly or indirectly, for example by means of mortar or the like, in thermal contact with the surrounding cooling element structure 26 so that the surrounding cooling element structure 26 is configured to cool said at least one continuous surrounding upright refractory layer 42. Said at least one continuous surrounding upright refractory layer 42 can comprise refractory bricks or refractory material capable of withstand temperature of at least 500° C., preferably of at least 1000° C.

Each binding section 6 of the surrounding binding structure 5 can have side edges 25.

If each binding section 6 of the surrounding binding structure 5 have side edges 25, the adjacent side edges 25 of the each binding section 6 of the surrounding binding structure 5 are preferably, but not necessarily, configured to be brought into adjacency by the tension assemblies 9 so that the tension assemblies 9 are configured to allow relative movement between the side edges 25 of adjacent binding sections 6 in the surrounding binding structure 5 and so that the tension assemblies 9 configured to force the side edges 25 of adjacent binding sections 6 in the surrounding binding structure 5 in a direction towards each other as in the embodiments illustrated in the figures.

In some embodiments of the metallurgical furnace 1, each adjacent binding section 6 of the surrounding binding structure 5 comprises preferably, but not necessarily, two attachment means 14. In such embodiments of the metallurgical furnace 1, the two attachment means 14 of each adjacent binding section 6 of the surrounding binding structure 5 are provided space apart so that adjacent binding sections 6 in the surrounding binding structure 5 form adjacent attachment means 14. In such embodiments of the metallurgical furnace 1, the adjacent attachment means 14 of the surrounding binding structure 5 are essentially at the same vertical height of the metallurgical furnace 1 and being connected by tension assemblies 9.

In the surrounding binding structure 5, adjacent binding sections 6 of the surrounding binding structure 5 are preferably, but not necessarily, connected by tension assemblies 9 so that tension assemblies 9 extend between attachment means 14 provided at adjacent binding sections 6 of the surrounding binding structure 5. Each adjacent binding section 6 of the surrounding binding structure 5 comprises preferably, but not necessarily, at least two attachment means 14. The attachment means 14 can be in the form of flanges or comprise flanges. With flanges in this context meant for example plate-like constructions having a thickness that is essentially smaller than their lateral dimensions such as width and length.

If each binding section 6 of the surrounding binding structure 5 have side edges 25 and if adjacent binding sections 6 of the surrounding binding structure 5 are connected by tension assemblies 9 so that tension assemblies 9 extend between attachment means 14 provided at adjacent binding sections 6 of the surrounding binding structure 5, said attachment means 14 are preferably, but not necessarily, provided at side edge 25 of said adjacent binding section 6 of the surrounding binding structure 5, in such case as illustrated in the figures. The attachment means 14 of adjacent binding sections 6 are preferably, but not necessarily, in such case essentially parallel in the surrounding binding structure 5 as illustrated in the figures. The attachment means 14 can alternatively be provided differently such as at a distance from the side edges 25 of each binding section 6 of the surrounding binding structure 5.

If adjacent binding sections 6 of the surrounding binding structure 5 are connected by tension assemblies 9 so that tension assemblies 9 extend between attachment means 14 provided at adjacent binding sections 6 of the surrounding binding structure 5, at least one tension assembly 9 of the tension assemblies 9 comprises preferably, not necessarily a first compressive member 29 on one side of two attachment means 14 formed by two adjacent binding sections 6 in the surrounding binding structure 5 and a second compressive member 30 on the opposite side of said two attachment means 14 formed by said two adjacent binding sections 6 in the surrounding binding structure 5 so that the first compressive member 29 and the second compressive member 30 are functionally connected together so as to allow relative movement between said two attachment means 14 formed by two adjacent binding sections 6 of the surrounding binding structure 5 and so as to force said two attachment means 14 formed by two adjacent binding sections 6 in the surrounding binding structure 5 in a direction towards each other. In such case said at least one tension assembly 9 of the tension assemblies 9 comprises preferably, but not necessarily, a rod 15 that penetrates said two attachment means 14 formed by two adjacent binding sections 6 in the surrounding binding structure 5, and in such case the first compressive member 29 comprises a first spring arrangement 16 around the rod 15 on one side of said two attachment means 14 and a first adjustable retainer 17 configured to keep the first spring arrangement 16 around the rod 15 and configured to keep the first spring arrangement 16 between the first adjustable retainer 17 and said two adjacent attachment means 14 in a pre-compressed and compressible state, and in such case the second compressive member 30 comprises a second spring arrangement 18 around the rod 15 on the opposite side of said two attachment means 14 and a second adjustable retainer 19 configured to keep the second spring arrangement 18 around the rod 15 and configured to keep the second spring arrangement 18 between the second adjustable retainer 19 and said two adjacent attachment means 14 in a pre-compressed and compressible state. In other words, the rod 15 functionally connects the first compressive member 29 comprising the first spring arrangement 16 and the first adjustable retainer 17 together with the second compressive member 30 comprising the second spring arrangement 18 and the second adjustable retainer 19. Such tension assembly 9 provides for sufficient force and is durable and has a long service-life. At least one of the first spring arrangement 16 and the second spring arrangement 18 can comprise Belleville springs.

Each binding section 6 in the surrounding binding structure 5 defines preferably, but not necessarily, an upper edge 20 and a lower edge 21 that is parallel with the upper edge 20. Adjacent binding sections 6 of the surrounding binding structure 5 can be connected by tension assemblies 9 so that the tension assemblies 9 extend between attachment means 14 attached between the upper edge 20 and the lower edge 21 of adjacent binding sections 6 of the surrounding binding structure 5.

Each binding section 6 of the surrounding binding structure 5 can comprise an upper supporting means 22 and a lower supporting means 23. The upper supporting means 22 and the lower supporting means 23 can form a part of said at least one planar surface means 43 of the binding sections 6 of the surrounding binding structure 5.

The upper supporting means 22 can for example be in the form a flange or comprise a flange or for example be or comprise a plate-like constructions having a thickness that is essentially smaller than their lateral dimensions such as width and length.

The lower supporting means 23 can for example be in the form a flange or comprise a flange or for example be or comprises a plate-like constructions having a thickness that is essentially smaller than their lateral dimensions such as width and length.

Adjacent binding sections 6 of the surrounding binding structure 5 can be connected by tension assemblies 9 so that the tension assemblies 9 extend between attachment means 14 attached to the upper supporting means 22 and the lower supporting means 23 of adjacent binding sections 6 of the surrounding binding structure 5. Adjacent binding sections 6 of the surrounding binding structure 5 can be connected by tension assemblies 9 so that the tension assemblies 9 extend between attachment means 14 provided between the upper supporting means 22 and the lower supporting means 23 of adjacent binding sections 6 of the surrounding binding structure 5. An advantage of this is evenly distributed compression of the surrounding surface 24 of the hearth and evenly distributed compression of the surrounding cooling element structure 26 which leads to that the hearth 2 and the cooling elements 12 of the surrounding cooling element structure 26 keeps it shape and the result is effective cooling and a more durable structure of the metallurgical furnace 1 and a longer service-life of the metallurgical furnace 1.

Such upper supporting means 22 and such lower supporting means 23 are preferably, but not necessarily, essentially parallel. The upper supporting means 22 can be utilized for connection the surrounding binding structure 22 to a possible surrounding sidewall supporting structure 4 of metal as illustrated in the figures. The lower supporting means 23 can be utilized for connection the surrounding binding structure 22 to a possible cooled supporting structure 40 illustrated in the figures.

Between the possible upper supporting means 22 and the possible lower supporting means 23 can at least one intermediate support structure 44 be provided so that said at least one intermediate support structure 44 can form a part of said at least one planar surface means 43 of the binding sections 6 of the surrounding binding structure 5. The tension assemblies 9 can additionally be connected to such said at least one intermediate support structure 44. Such at least one intermediate support structure 44 makes the binding section 6 of the surrounding structure 5 more rigid and stiffer so that the binding section 6 of the surrounding structure 5 can better keep its shape and promotes in this way even compression of the hearth 2 of the metallurgical furnace 1 by a large area of the binding section 6 of the surrounding structure 5.

The surrounding binding structure 5 can extend in the vertical direction to a level above the surrounding surface 24 of the hearth 2 of the metallurgical furnace 1 and/or to a level below the surrounding surface 24 of the hearth 2 of the metallurgical furnace 1. In the embodiment of the metallurgical furnace 1 illustrated in the figures, see especially FIGS. 2 and 3, the surrounding binding structure 5 extend in the vertical direction to a level above the surrounding surface 24 of the hearth 2 of the metallurgical furnace 1, but the surrounding binding structure 5 can additionally extend in the vertical direction to a level below the surrounding surface 24 of the hearth 2 of the metallurgical furnace 1 or the surrounding binding structure 5 can alternatively only extend in the vertical direction to a level below the surrounding surface 24 of the hearth 2 of the metallurgical furnace 1

The ratio of number of binding sections 6 in the surrounding binding structure 5 to the number of cooling elements 12 in the surrounding cooling element structure 26 is preferably, but not necessarily, 1 to N, where N between 2 and 8, preferably between 2 and 4, more preferably 2. This means that the number of number of cooling elements 12 in the surrounding cooling element structure 26 is preferably, but not necessarily two to eight times the number of binding sections 6 in the surrounding binding structure 5, more preferably that the number of number of cooling elements 12 in the surrounding cooling element structure 26 is preferably, but not necessarily two to four times the number of binding sections 6 in the surrounding binding structure 5, and most preferably that the number of number of cooling elements 12 in the surrounding cooling element structure 26 is preferably, but not necessarily two times the number of binding sections 6 in the surrounding binding structure 5. This provides for a tight structure that at the same time is both rigid and flexible. The number of binding sections 6 in the surrounding binding structure 5 can for example being at least 15, preferably 15 to 40, and the number of cooling elements 12 in the surrounding cooling element structure 26 can for example being at least 30, preferably 30 to 80. This provides for a tight structure that at the same time is both rigid and flexible.

Adjacent binding sections 6 in the surrounding binding structure 5 are preferably, but not necessarily, as illustrated in FIGS. 5 to 7, configured to overlap each other in at least 25%, preferably in at least 50%, more preferably in at least 75% of second joints 28 formed between two adjacent binding sections 6 in the surrounding binding structure 5 in a surrounding direction of the surrounding binding structure 5. This provides for a tighter surrounding binding structure 5.

Adjacent cooling element 12 in the surrounding cooling element structure 26 being are preferably, but not necessarily, as illustrated in FIGS. 5 to 7, configured to overlap each other in at least 25%, preferably in at least 50%, more preferably in at least 75% of first joints 27 formed between two adjacent cooling element 12 in the surrounding cooling element structure 26 in a surrounding direction of the surrounding cooling element structure 26. This provides for a tighter surrounding cooling element structure 26.

The metallurgical furnace 1 can comprise a sensor arrangement (not illustrated in the figures) configured to measure the relative movement between at least two adjacent binding sections 6 of the surrounding binding structure 5. This allows for measuring of the thermal expansion of the hearth 2 of the metallurgical furnace 1. The sensor arrangement can manually operated or automatically operated or remotely operated.

At least 25%, preferably in at least 50%, more preferably in at least 90% of first joints 27 formed between two adjacent cooling elements 12 of the surrounding cooling element structure 26 is preferably, but not necessarily, unaligned with a second joint 28 formed between two adjacent binding sections 6 of the surrounding binding structure 5 at the vertical level of the surrounding binding structure 5 of the metallurgical furnace 1. This provides for a tight structure that at the same time is both rigid and flexible, because first joints 27 and second joints 28 are not aligned.

At least 25%, preferably in at least 50%, more preferably in at least 90% of first joints 27 formed between two adjacent cooling elements 12 of the surrounding cooling element structure 26 is in the radial direction of the metallurgical furnace 1 preferably, but not necessarily, located at one binding section 6 of the surrounding binding structure 5 at the vertical level of the surrounding binding structure 5 of the metallurgical furnace 1, and at least 25%, preferably in at least 50%, more preferably in at least 90% of second joints 28 formed between two adjacent binding sections 6 of the surrounding binding structure 5 is in the radial direction of the metallurgical furnace 1 located at a cooling element 12 of the surrounding cooling element structure 26 at the vertical level of the surrounding binding structure 5 of the metallurgical furnace 1. This provides for a tight structure that at the same time is both rigid and flexible, because first joints 27 and second joints 28 are not aligned.

Said at least one planar surface means 43 of at least one binding section 6 of the surrounding binding structure 5 is preferably, but not necessarily, as illustrated in the figures, formed at least partly by a planar metal plate 8 of a plate section 7 of said at least one binding section 6 of the surrounding binding structure 5. Such planar metal plates 8 promotes the distribution of compression between the binding section 6 and the cooling element 12 and surrounding surface 24 of the hearth 2. Even compression ensures that the cooling element 12 is not bent and the result is effective cooling and a more durable structure of the metallurgical furnace 1 and a longer service-life of the metallurgical furnace 1.

At least one binding section 6 of the surrounding binding structure 5 comprises preferably, but not necessarily, at least two planar surface means 43 provided in an angle with respect to each other.

If at least one binding section 6 of the surrounding binding structure 5 of at least two planar surface means 43 provided in an angle with respect to each other, each planar surface means 43 of said at least two planar surface means 43 of said at least one binding section 6 of the surrounding binding structure 5 is preferably, but not necessarily, parallel with the planar back surface 13 of a respective one of the cooling elements 1 of the surrounding cooling element structure 26, and each planar surface means 43 of said at least two planar surface means 43 of said at least one binding section 6 of the surrounding binding structure 5 is preferably, but not necessarily, parallel with and supports in the horizontal direction of the metallurgical furnace 1 at least partly the part of the planar back surface 13 of the respective one of the cooling elements 12 of the surrounding cooling element structure 26 that is located at a vertical level of the metallurgical furnace 1 at said at least one binding section 6 of the surrounding binding structure 5. Such planar surface means 43 provided in an angle with respect to each other promotes the distribution of compression between the binding section 6 and the cooling elements 12 and surrounding surface 24 of the hearth 2 and promotes compression in first joints 27 between adjacent cooling elements 12 in the surrounding cooling element structure 26. Even compression ensures that the cooling element 12 is not bent and the result is effective cooling and a more durable structure of the metallurgical furnace 1 and a longer service-life of the metallurgical furnace 1.

At least one binding section 6 of the surrounding binding structure 5 comprises preferably, but not necessarily, as illustrated in the figures, at least three planar surface means 43 provided in an angle with respect to each other, so that firstly a first planar surface means 43 of said at least three planar surface means 43 is parallel with the planar back surface 13 of a first cooling element 12 of the surrounding cooling element structure 26 and supports at a central region 31 of said at least one binding section 6 in the horizontal direction of the metallurgical furnace 1 essentially the complete part of the planar back surface 13 of said first cooling element 12 of the surrounding cooling element structure 26 that is located at the vertical level of the metallurgical furnace 1 at said at least one binding section 6 of the surrounding binding structure 5, and secondly so that a second planar surface means 43 of said at least three planar surface means 43 is parallel with the planar back surface 13 of a second cooling element 12 of the surrounding cooling element structure 26 and supports at a first side region 32 of said at least one binding section 6 a first section 34 of the part of the planar back surface 13 of said second cooling element 12 of the surrounding cooling element structure 26 that is located at the vertical level of the metallurgical furnace 1 at said at least one binding section 6 of the surrounding binding structure 5, and thirdly so that a third planar surface means 43 of said at least three planar surface means 43 is parallel with the planar back surface 13 of a third cooling element 12 of the surrounding cooling element structure 26 and supports at a second side region 33 of said at least one binding section 6 a second section 35 of the part of the planar back surface 13 of said third cooling element 12 of the surrounding cooling element structure 26 that is located at the vertical level of the metallurgical furnace 1 at said at least one binding section 6 of the surrounding binding structure 5. Such planar surface means 43 provided in an angle with respect to each other promotes the distribution of compression between the binding section 6 and the cooling elements 12 and surrounding surface 24 of the hearth 2 and promotes compression in first joints 27 between adjacent cooling elements 12 in the surrounding cooling element structure 26. Even compression ensures that the cooling element 12 is not bent and the result is effective cooling and a more durable structure of the metallurgical furnace 1 and a longer service-life of the metallurgical furnace 1.

Cooling elements 12 of the surrounding cooling element structure 26 can either be attached or unattached to the binding sections 6 of the surrounding binding structure 5. If they are unattached, the cooling elements 12 can move in relation to the binding sections 6 of the surrounding binding structure 5.

Cooling elements 12 of the surrounding cooling element structure 26 comprise preferably, but not necessarily, fluid channels (not illustrated in the figures) formed inside the cooling elements 12. At least some of the fluid channels are preferably, but not necessarily, at least partly formed of the material of the cooling elements 12 so that fluid circulating in the channels is at least in sections of the fluid channels in direct contact with the material of the cooling element 12 that also forms a fire surface (not marked with a reference numeral) of the cooling element 12. This provided for, excellent thermal transfer between the fire surface and the fluid flowing in the fluid channels and the result is effective cooling and a more durable structure of the metallurgical furnace 1 and a longer service-life of the metallurgical furnace 1. The cooling element can be continuous casted cooling elements.

The metallurgical furnace can, as illustrated in the figures, comprise a surrounding sidewall supporting structure 4 of metal surrounding at least partly the surrounding cooling element structure 26, so that the cooling elements 12 of the surrounding cooling element structure 26 are attached to the surrounding sidewall supporting structure 4.

If the metallurgical furnace comprise a surrounding sidewall supporting structure 4 of metal surrounding at least partly the surrounding cooling element structure 26, the surrounding sidewall supporting structure 4 can, as illustrated in the figures, comprise a sidewall structure tier 10 that is arranged above the surrounding binding structure 5 and that is connected to the surrounding binding structure 5, wherein the sidewall structure tier 10 comprise sidewall sections 11, and wherein each sidewall section 11 having one cooling element 12 of the surrounding cooling element structure 26 attached thereto. The sidewall structure tier 10 is preferably, but not necessarily, as illustrated in the figures, connected to the surrounding binding structure 5 by flexible connection means allowing the sidewall structure tier 10 of the surrounding sidewall supporting structure 4 to move with respect to the surrounding binding structure 5 for example as a result of thermal expansion. Adjacent sidewall sections 11 in the sidewall structure tier 10 are preferably, but not necessarily, as illustrated in the figures. connected together by flexible connection means allowing adjacent sidewall sections 11 of the sidewall structure tier 10 to move with respect to each other for example as a result of thermal expansion.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A metallurgical furnace comprising:
a hearth comprising a surrounding surface,
a sidewall structure that extends upwards from the hearth of the metallurgical furnace,
a surrounding cooling element structure comprising cooling elements, wherein each cooling element has a planar back surface,
a surrounding binding structure of metal surrounding at least partly the surrounding surface of the hearth of the metallurgical furnace,
the surrounding binding structure comprising binding sections of metal each binding section comprising at least one planar surface means,
adjacent binding sections of the surrounding binding structure being connected by tension assemblies configured to allow relative movement between adjacent binding sections in the surrounding binding structure and configured to force adjacent binding sections in the surrounding binding structure in a direction towards each other,
the surrounding cooling element structure being at least partly surrounded by the surrounding binding structure,
at least one planar back surface of at least one cooling element of the surrounding cooling element structure is parallel with at least one planar surface means of one binding section of the surrounding binding structure and is supported by said at least one planar surface means of one binding section of the surrounding binding structure, and
said at least one cooling element of the surrounding cooling element structure being located at least partly between the surrounding surface of the hearth of the metallurgical furnace and said one binding section of the surrounding binding structure.

2. The metallurgical furnace according to claim 1, wherein
the hearth comprises at least one continuous layer of refractory material, and
said at least one continuous layer of refractory material being laterally limited by the surrounding surface of the hearth.

3. The metallurgical furnace according to claim 1, wherein
the sidewall structure comprises at least one continuous surrounding upright refractory layer,
said at least one continuous surrounding upright refractory layer being in thermal contact with the surrounding cooling element structure, and
said at least one continuous surrounding upright refractory layer fully laterally surrounding a furnace space configured to hold molten material such as molten material containing molten metal.

4. The metallurgical furnace according to claim 1, wherein
adjacent binding sections of the surrounding binding structure being connected by tension assemblies so that tension assemblies extend between attachment means provided at adjacent binding sections of the surrounding binding structure.

5. The metallurgical furnace according to claim 1, wherein
the surrounding binding structure extend in the vertical direction to a level above the surrounding surface of the hearth of the metallurgical furnace and/or to a level below the surrounding surface of the hearth of the metallurgical furnace.

6. The metallurgical furnace according to claim 1, wherein
the ratio of the number of binding sections in the surrounding binding structure to the number of cooling elements in the surrounding cooling element structure being 1 to N, where N is 2 to 8.

7. The metallurgical furnace according to claim 1, wherein
the number of binding sections in the surrounding binding structure being at least 15, and
the number of cooling elements in the surrounding cooling element structure being at least 30.

8. The metallurgical furnace according to claim 1, wherein
adjacent binding sections in the surrounding binding structure being configured to overlap each other in at least 25% of second joints between two adjacent binding sections in the surrounding binding structure in a surrounding direction of the surrounding binding structure.

9. The metallurgical furnace according to claim 1, wherein
adjacent cooling element in the surrounding cooling element structure being configured to overlap each other in at least 25% of first joints between two adjacent cooling element in the surrounding cooling element structure in a surrounding direction of the surrounding cooling element structure.

10. The metallurgical furnace according to claim 1, wherein
at least 25% of first joints between two adjacent cooling elements of the surrounding cooling element structure are unaligned with a second joint between two adjacent binding sections of the surrounding binding structure at a vertical level of the surrounding binding structure of the metallurgical furnace.

11. The metallurgical furnace according to claim 1, wherein
at least 25% of first joints between two adjacent cooling elements of the surrounding cooling element structure are in a radial direction of the metallurgical furnace located at one binding section of the surrounding binding structure at a vertical level of the surrounding binding structure of the metallurgical furnace, and
at least 25% of second joints between two adjacent binding sections of the surrounding binding structure are in the radial direction of the metallurgical furnace located at a cooling element of the surrounding cooling element structure at the vertical level of the surrounding binding structure of the metallurgical furnace.

12. The metallurgical furnace according to claim 1, wherein
said at least one planar surface means of at least one binding section of the surrounding binding structure being formed at least partly by a planar metal plate of a plate section of said at least one binding section of the surrounding binding structure.

13. The metallurgical furnace according to claim 1, wherein
the cooling elements of the surrounding cooling element structure being unattached to the binding sections of the surrounding binding structure.

14. The metallurgical furnace according to claim 1, wherein a surrounding sidewall supporting structure of metal surrounding at least partly the surrounding cooling element structure, and the cooling elements of the surrounding cooling element structure being attached to the surrounding sidewall supporting structure.

15. The metallurgical furnace according to claim 1, wherein the surrounding cooling element structure being partly surrounded by the surrounding binding structure.

* * * * *